United States Patent Office 3,345,060
Patented Oct. 3, 1967

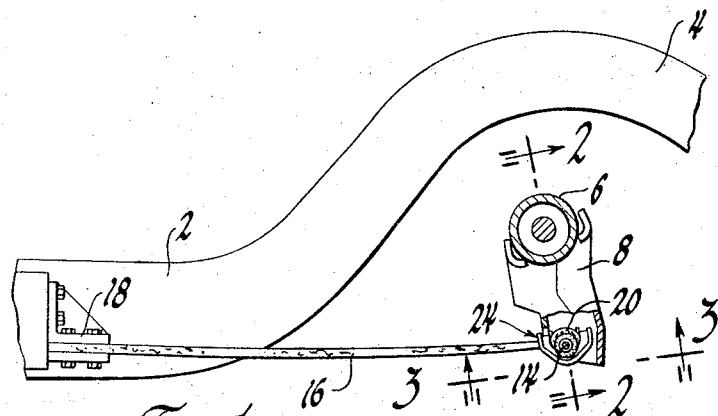
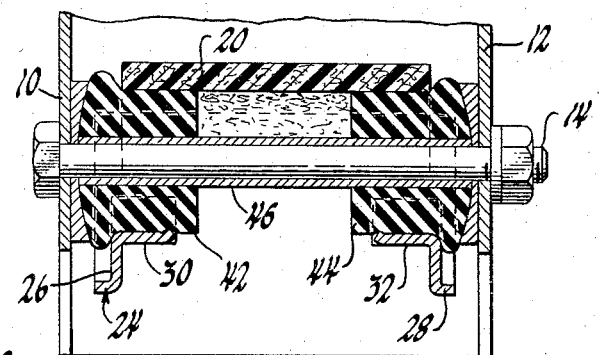
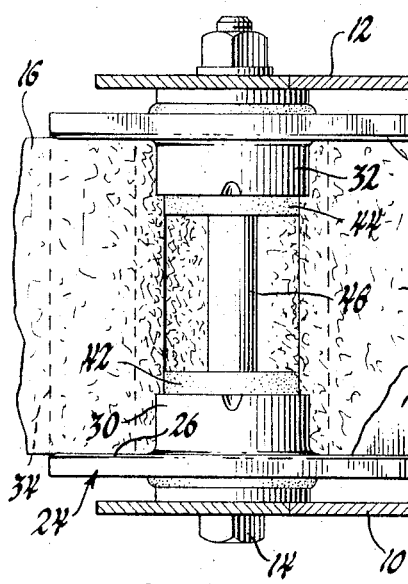
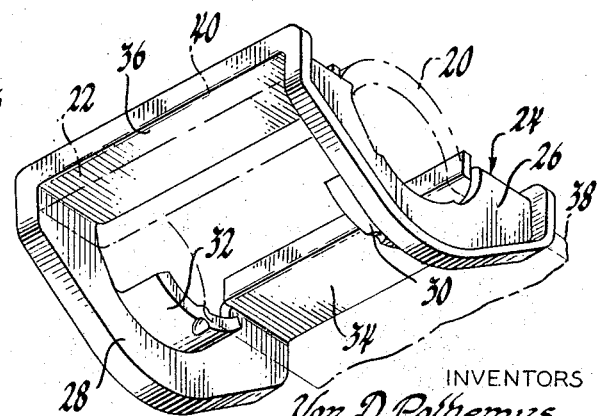

3,345,060
LEAF SPRING ASSEMBLY
Von D. Polhemus, Harold E. Boettger, and Manfred A. Isaacson, Pontiac, and Ming-Chih Yew, Utica, Mich., assignors to General Motors Corporation, Detroit, Mich., a corporation of Delaware
Filed Oct. 23, 1965, Ser. No. 504,011
3 Claims. (Cl. 267—54)

This invention relates to leaf springs and mor particularly to fiberglass reinforced plastic leaf spring assemblies.

In recent years a variety of techniques for fabricating leaf or blade springs for fiberglass reinforced plastic have been devised. However, in forming such springs with suitable end loops or eyes, such as are conventional in steel springs, certain practical difficulties arise. The purpose of the present invention is to eliminate the time consuming and practical difficulties associated with an integral wrapped eye by the utilization of a metal saddle bracket in operative association with a simply semi-circular convolution near one or both ends of the fiberglass spring.

FIGURE 1 is a fragmentary side elevational view of a vehicle suspension construction utilizing a fiberglass spring assembly embodying the invention.

FIGURE 2 is a greatly enlarged sectional front elevation looking in the direction of arrows 2—2 of FIGURE 1.

FIGURE 3 is a fragmentary plan view looking in the direction of arrows 3—3 of FIGURE 1.

FIGURE 4 is a partially phantomized perspective view illustrating the configuration of the bracket associated with the leaf spring.

Referring now to the drawing and particularly FIGURE 1, there is shown a vehicle suspension construction wherein reference numeral 2 designated a portion of the frame side rail which includes arched portion 4. Extending transversely beneath portion 4 is a conventional axle assembly 6 having a depending bracket 8 connected thereto. At its lower end, bracket 8 is formed with a pair of transversely spaced parallel side walls 10 and 12 through which extends a pivot shaft 14. Shaft 14 serves to pivotally connect the rearward end of a fiberglass reinforced leaf spring 16 to the axle while the forward end thereof is clamped in a bracket 18 on side rail 2.

While steel cantilever springs of the general type shown are well known in the prior art, the customary practice is to provide an integral wrapped eye at the rearward end thereof which surrounds the pivot shaft 14. However, in accordance with the present invention, the complexity inherent in forming such an eye in a fiberglass reinforced member is obviated by providing the rear end of the spring with a simple upwardly bowed semi-circular wall portion 20 immediately forwardly adjacent the rearward end 2 thereof. The remainder of the eye is then provided by a formed metal saddle bracket 24 having parallel vertical side walls 26 and 28 which straddle the width of the spring. The side walls 26 and 28 in turn are formed with transversely inwardly extending semi-circular curved portions 30 and 32 generated about an axis coinciding with the axis about which semi-circular wall 20 is generated.

As seen best in FIGURE 4, the side walls 26 and 28 are integral with longitudinally spaced transversely extending flat portions 34 and 36 which are adapted to bear downwardly against the vertically adjacent lower flat surfaces 38 and 40 of blade 16. Consequently, when assembled in the relationship shown, the semi-circular wall 20 of spring 16 and curved portions 30 and 32 of the saddle bracket form transversely aligned sleeve-like openings permitting lateral insertion of elastic annular bushings 42 and 44. Bushings 42 and 44 in turn surround a tubular metal sleeve 46 carried by the pivot shaft 14. It will, therefore, be seen that when assembled in the manner described, an interlocking relationship is established between saddle bracket 28, the rearward end of spring 16, and pivot shaft 14 which enables the rearward end of the spring to pivot freely about shaft 14 in the same manner as an integral wrapped eye.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In combination, a longitudinally extending blade member having a deformed portion thereof defining an upwardly bowed semi-circular wall generated about a transverse axis, a saddle bracket straddling said blade in longitudinal alignment with said axis, said bracket having longitudinally spaced transverse portions abutting the upper surface of said blade member connected by parallel side wall portions extending beyond the lower surface of said blade, and means forming a downwardly bowed semi-circular wall in said side walls generated about said transverse axis.

2. In combination, a longitudinally extending blade member having a deformed portion defining an upwardly bowed semi-circular wall generated about a transverse axis, a saddle bracket straddling said blade member, said bracket having longitudinally spaced transverse portions abutting the upper surface of said blade in close proximity to said semi-circular wall, said transverse portions being connected by parallel side wall portions abutting the side edges of said blade and extending beyond the lower surface of said blade, means formed in said side wall portions defining oppositely inwardly directed downwardly bowed semi-circular wall portions generated about said transverse axis, and a pivot assembly extending through said side walls on said axis.

3. The structure set forth in claim 2 wherein said pivot assembly includes annular bushings radially confined between said upwardly bowed wall and said downwardly bowed wall portions.

No references cited.

ARTHUR L. LA POINT, *Primary Examiner.*

R. M. WOHLFARTH, *Assistant Examiner.*

UNITED STATES PATENT OFFICE
CERTIFICATE OF CORRECTION

Patent No. 3,345,060                          October 3, 1967

Von D. Polhemus et al.

It is hereby certified that error appears in the above numbered patent requiring correction and that the said Letters Patent should read as corrected below.

Column 1, line 10, for "mor" read -- more --; line 14, for "for fiberglass" read -- from fiberglass --; line 37, for "designated" read -- designates --; line 56, for "2" read -- 22 --.

Signed and sealed this 29th day of October 1968.

(SEAL)
Attest:

Edward M. Fletcher, Jr.
Attesting Officer

EDWARD J. BRENNER
Commissioner of Patents